United States Patent [19]

Koizumi et al.

[11] 4,039,853

[45] Aug. 2, 1977

[54] MAGNETIZING DEVICE FOR PERMANENT MAGNET MOTOR FOR ELECTRIC VEHICLE

[75] Inventors: Osamu Koizumi; Shigeki Saito; Shotaro Naito, all of Katsuta, Japan

[73] Assignee: Hitachi, Ltd., Japan

[21] Appl. No.: 617,731

[22] Filed: Sept. 29, 1975

[30] Foreign Application Priority Data

Sept. 30, 1974  Japan .............................. 49-111536

[51] Int. Cl.² ...................... H01F 13/00; H01F 27/42
[52] U.S. Cl. .................................. 307/101; 335/284; 361/147
[58] Field of Search ...................... 318/139; 310/156; 335/284; 307/101; 317/157.5

[56] References Cited

U.S. PATENT DOCUMENTS

| | | | |
|---|---|---|---|
| 2,529,049 | 11/1950 | Ross | 335/284 |
| 2,609,411 | 9/1952 | Reijnst et al. | 307/101 |
| 3,678,436 | 7/1972 | Herdrich | 335/284 |

Primary Examiner—David Smith, Jr.
Attorney, Agent, or Firm—Craig & Antonelli

[57] ABSTRACT

A magnetizing device for a permanent magnet motor used for driving an electric vehicle in which a magnetizing coil is wound around the permanent magnet of the permanent magnet motor, and means are provided for detecting a specific step such as manipulation of the key switch in the electric vehicle in a series of predetermined steps required for the operation of the electric vehicle. In response to the detection of such specific manipulation, magnetizing current is supplied to the magnetizing coil from the battery of the electric vehicle so that the permanent magnet can be automatically magnetized.

3 Claims, 4 Drawing Figures

MAGNETIZING DEVICE FOR PERMANENT MAGNET MOTOR FOR ELECTRIC VEHICLE

BACKGROUND OF THE INVENTION

1. FIELD OF THE INVENTION

This invention relates to magnetizing means for permanent magnet motors, and more particularly to a permanent magnet magnetizing device suitable for use in electric vehicles.

2. DESCRIPTION OF THE PRIOR ART

Permanent magnets of permanent magnet motors are generally magnetized by a stationary magnetizing equipment. However, inspections including checking of the degree of demagnetization of the permanent magnets are commonly rarely done when the permanent magnet motors are incorporated as a part of various machines. The permanent magnets of these permanent magnet motors are designed so as not to be easily demagnetized in an ordinary operating condition. However, in the case of the permanent magnet motors mounted on electric vehicles, great overload capacity is generally required to deal with overload encountered during, for example, acceleration and ascending an incline.

In the electric vehicle driven by the permanent magnet motor, direct application of non-controlled dc power supply voltage to the motor due to current commutation failure or breakdown of a thyristor chopper results in the flow of maximum armature current, and the armature reaction is increased to cause undesirable demagnetization of the permanent magnet in the field system. This undesirable demagnetization of the permanent magnet is also given rise to by natural deterioration with time. When the permanent magnet motor is operated in the state in which the permanent magnet in the field system is demagnetized for the reason above described, the required maximum torque cannot be developed due to the weakened field strength, and armature current excessively greater than that supplied in the non-demagnetized state of the permanent magnet must be supplied for developing the required motor torque, resulting in generation of excessive heat in the motor tending to impart damage to the permanent magnet. Thus, the acceleration characteristic and incline ascending characteristic of the electric vehicle will be extremely degraded to reduce the operating efficiency, with the result that the distance through which the electric vehicle can run without any make-up of the charge will become shorter than when the permanent magnet is free from demagnetization, and the operating performance of the electric vehicle will be extremely lowered to such an extent that the electric vehicle cannot properly operate.

A magnetizing equipment has been generally provided separately from the permanent magnet motor for the maintenance of the permanent magnet in the field system of the motor. For the magnetization of the permanent magnet subjected to demagnetization, the motor is disassembled and the magnetizing equipment is used for magnetizing the permanent magnet removed from the motor. Further, a slightly simplified method has been employed hitherto in which the armature winding of the permanent magnet motor is utilized for magnetizing the permanent magnet subjected to demagnetization. However, maintenance of the permanent magnet according to these prior art methods has been defective and very difficult in that the magnetizing equipment used for the magnetization of the permanent magnet is quite expensive and bulky, that the wiring of the electric vehicle must be disconnected in order to connect the motor to the magnetizing equipment, and that an ac power source is required for the operation of the magnetizing equipment.

A permanent magnet having a large coercive force and a high residual magnetic flux density is preferable in order that it can withstand demagnetization and the size and weight thereof can be reduced. However, such a permanent magnet is too expensive to be practically put into commercial use.

SUMMARY OF THE INVENTION

It is a primary object of the present invention to obviate the prior art defects above described and to provide a novel and useful magnetizing device which can be used to magnetize an inexpensive permanent magnet of a permanent magnet motor used for driving an electric vehicle.

Such an inexpensive permanent magnet can be satisfactorily used since a large coercive force is not required for the permanent magnet when the permanent magnet can be easily magnetized by suitable simple and convenient means.

In the present invention, a part of a series of predetermined steps required essentially for starting the electric vehicle from the stopped state or stopping the electric vehicle from the running state is detected and the battery of the electric vehicle is utilized for automatically magnetizing the permanent magnet so that the permanent magnet can be maintained always in the desired magnetized state.

DESCRIPTION OF THE PREFERRED EMBODIMENTS

Figure 1:
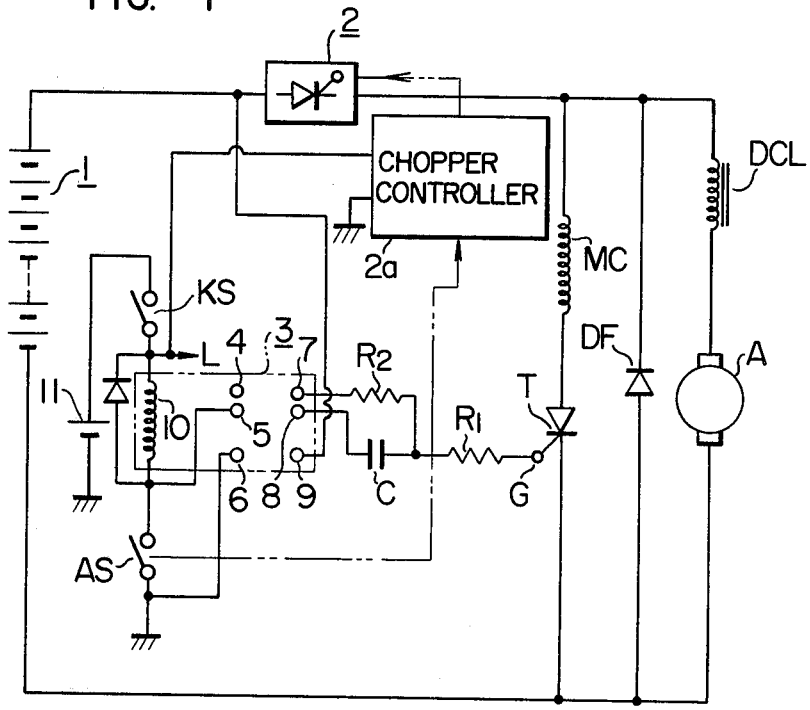
FIG. 1 is a circuit diagram of a preferred embodiment of the magnetizing device according to the FIGS. 2 and 4 are circuit diagrams of other preferred embodiments of the present invention.

A preferred embodiment of the magnetizing device according to the present invention will be described with reference to FIG. 1. Referring to FIG. 1, the main circuit includes a main power source 1, a chopper 2, a chopper controller 2a, a dc reactor DTL, and an armature A of a permanent magnet motor mounted on an electric vehicle. A free-wheel diode DF is connected across the dc reactor DcL and armature A for smoothing the armature current. A magnetizing coil MC is wound around the permanent magnet (not shown) of the permanent magnet motor and is connected at one end thereof to a thyristor T and at the other end thereof to the output terminal of the chopper 2.

The gate G of the thyristor T is connected to one terminal of a resistor $R_1$ which is connected at the other terminal thereof to one terminal of a capacitor C and to one terminal of another resistor $R_2$. The capacitor C is provided to supply gate current for a predetermined period of time, and the charge of the capacitor C is discharged through the resistor $R_2$. The resistor $R_2$ and capacitor C are connected at the other terminal thereof to a stationary contact 7 and a movable contact 8 respectively of a relay 3. A normally-open stationary contact 9 of the relay 3 is connected to the main power source 1. The relay 3 includes further another stationary contact 4, another movable contact 5, another normally-open stationary contact 6 and an energizing coil 10, and the movable contact 5 and normally-open stationary contact 6 of the relay 3 are connected across an accelerator switch AS of the electric vehicle. A key switch KS, the energizing coil 10 of relay 3 and the accelerator switch AS are connected in series with a low-voltage or auxiliary power source 11. The accelerator switch AS and chopper controller 2a are arranged for interlocking operation so that the chopper 2 can start chopping operation simultaneously with the turn-on of the accelerator switch AS. The chopper controller 2a is connected to a line L to which the auxiliary power source 11 is connected through the key switch KS for supplying low voltage to loads including lamps.

In one form of the present invention, the permanent magnet of the permanent magnet motor is magnet magnetized in response to a specific step in a series of predetermined steps required for starting the electric vehicle from the stopped state. More precisely, in the form shown in FIG. 1, the permanent magnet of the permanent magnet motor is magnetized only when the accelerator pedal is initially depressed after turning on the key switch KS. Thereafter, on-off of the accelerator switch AS has no relation with the magnetization of the permanent magnet, and the permanent magnet is not magnetized unless the key switch KS is turned off and then turned on again.

The operation of the magnetizing device according to the present invention will now be described with reference to FIG. 1. When the electric vehicle is in the stopped state, the relay contacts and switches are in the positions illustrated in FIG. 1 (In FIG. 1, elements such as a circuit breaker and a fuse are not shown for the sake of simplicity of illustration.)

The first step required for starting the electric vehicle is to turn on the key switch KS. In response to the turn-on of the key switch KS, the auxiliary power source 11 supplies low voltage by way of the line L to the chopper controller 2a which controls the chopper 2, and the electromobile is ready for starting. Then, when the accelerator pedal is depressed, the accelerator switch AS is turned on, and the chopper 2 starts to operate. In response to the turn-on of the accelerator switch AS, current is supplied to the relay energizing coil 10 by the circuit which is traced from the auxiliary power source 11 — key switch KS — energizing coil 10 to the accelerator switch AS, and the movable contacts 5 and 8 are brought into contact with the stationary contacts 6 and 9 respectively. The accelerator switch AS is shorted as the result of the engagement of the movable contact 5 with the stationary contact 6. However, the energizing coil 10 remains in the energizing stte independently of on-off of the accelerator switch AS inasmuch as the key switch KS is in the on state. The relay 3 thus energized holds itself in the energized state.

On the other hand, due to the engagement of the movable contact 8 with the stationary contact 9, gate current is supplied to the gate G of the thyristor T by the circuit which is traced from the main power source 1 — stationary contact 9 of relay 3 — movable contact 8 of relay 3 — capacitor C — resistor $R_1$ — gate G of thyristor T to the main power source 1, and magnetizing current flows through the circuit which is traced from the main power source 1 — chopper 2 — magnetizing coil MC — thyristor T to the main power source 1 to magnetize the permanent magnet of the permanent magnet motor. The current ceases to flow with the full accumulation of the charge in the capacitor C, and the thyristor T is turned off in the subsequent interruption period of the current turned on and off by the chopper 2, with the result that the current supply to the magnetizing coil MC is interrupted. Thereafter, no current is supplied to the magnetizing coil MC unless the key switch KS is turned off and then turned on again. Therefore, the chopper 2 operates in the usual manner without consuming any wasteful energy. For the magnetization of the permanent magnet, one or a plurality of output pulses of the chopper 2 may be supplied to the magnetizing coil MC for a period of time of one to several milliseconds.

Figure 2:
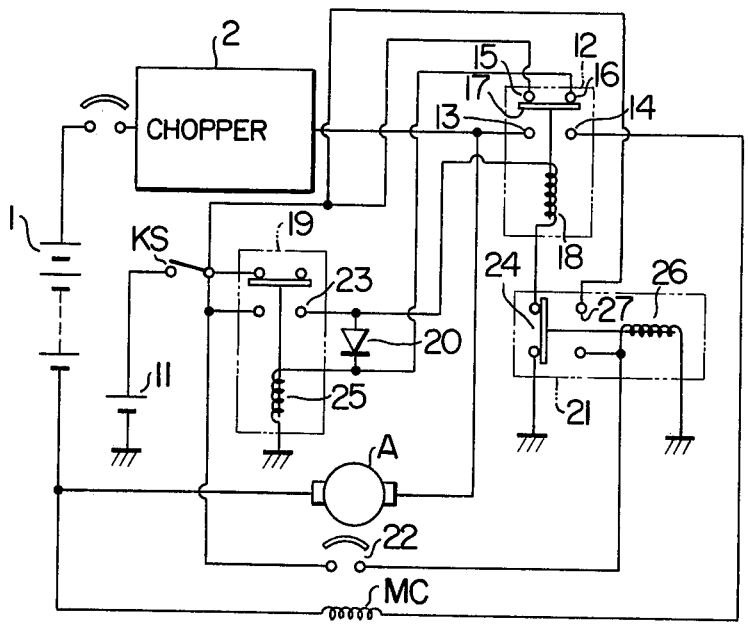

FIG. 2 shows another embodiment of the present invention. In FIG. 2, a relay 12 is used in place of the thyristor T shown in FIG. 1 for controlling the operation of the circuit including the magnetizing coil MC. In FIG. 2, like reference numerals and symbols are used to denote like parts appearing in FIG. 1.

Referring to FIG. 2, a main relay 12 is connected between a main power sourcce 1 and a magnetizing coil MC and includes normally-open stationary contacts 13, 14, normally-closed stationary contacts 15, 16, a movable contact 17, and an energizing coil 18. The relay energizing coil 18 is connected at one end thereof to a low-voltage or auxiliary power source 11 through normally-open stationary contacts 23 of a first auxiliary relay 19 and through a key switch KS, and at the other end thereof to ground through normally-closed stationary contacts 24 of a second auxiliary relay 21. An energizing coil 25 of the first auxiliary relay 19 is grounded at one end thereof and is connected at the other end thereof to the auxiliary power source 11 through the normally-closed stationary contacts 15, 16 of main relay 12 and through the key switch KS. An energizing coil 26 of the second auxiliary relay 21 is grounded at one end thereof and is connected at the other end thereof to the key switch KS through a temperature switch 22. The normally-open stationary contacts 27 of the second auxiliary relay 21 are connectd to the key switch KS and to the other end of the energizing coil 26.

In operation, the key switch KS is turned on to place the electric vehicle in the state ready for starting. In response to the turn-on of the key switch KS, current is supplied from the auxiliary power source 11 to the energizing coil 25 of the first auxiliary relay 19 by the circuit which is traced from the auxiliary power source 11 — key switch KS — normally — closed stationary contacts 15, 16 of main relay 12 to the relay energizing coil 25. As a result, the normally-open contacts 23 of the relay 19 are now closed, and the first auxiliary relay 19 holds itself through a diode 20. Current is supplied to the energizing coil 18 of the main relay 12, and the movable contact 17 is urged to close the normally-open stationary contacts 13, 14 of the main relay 12. When the accelerator pedal of the electric vehicle is depressed to actuate a chopper 2 in such a state, power supply voltage is applied from the main power source 1 to the armature A of the permanent magnet motor and also to the magnetizing ccoil MC through the main relay 12. The permanent magnet of the permanent magnet motor is magnetized by the magnetic flux produced by the current supplied to the magnetizing coil MC.

The temperature of the magnetizing coil MC rises progressively due to the flow of the current of predetermined value therethrough until the temperature switch 22 associated with the magnetizing coil MC is turned on. Consequently, the normally-open stationary contacts 27 of the second auxiliary relay 21 are closed to place the second auxiliary relay 21 in the selfholding state. The second auxiliary relay 21 is held in this state until the key switch KS is turned off. As a result of opening of the normally-closed stationary contacts 24 of the second auxiliary relay 21, the current supply to the energizing coil 18 of the main relay 12 is ceased to deenergize the main relay 12, and no voltage is applied to the magnetizing coil MC independently of the operation of the chopper 2. In this manner, the permanent magnet of the permanent magnet motor is magnetized for a predetermined period of time each time the key switch KS is turned on to place the chopper 2 in operation. Any other suitable means such as a timer or single pulse detector may be used in lieu of the temperature switch.

The embodiments described with reference to FIGS. 1 and 2 have referred to utilization of the chopper for the magnetization of the permanent magnet of the permanent magnet motor. However, in lieu of the utilization of the chopper for this purpose, another means may be employed for attaining the desired magnetization of the permanent magnet while the driver is unconscious of such process of magnetization.

Figure 3:
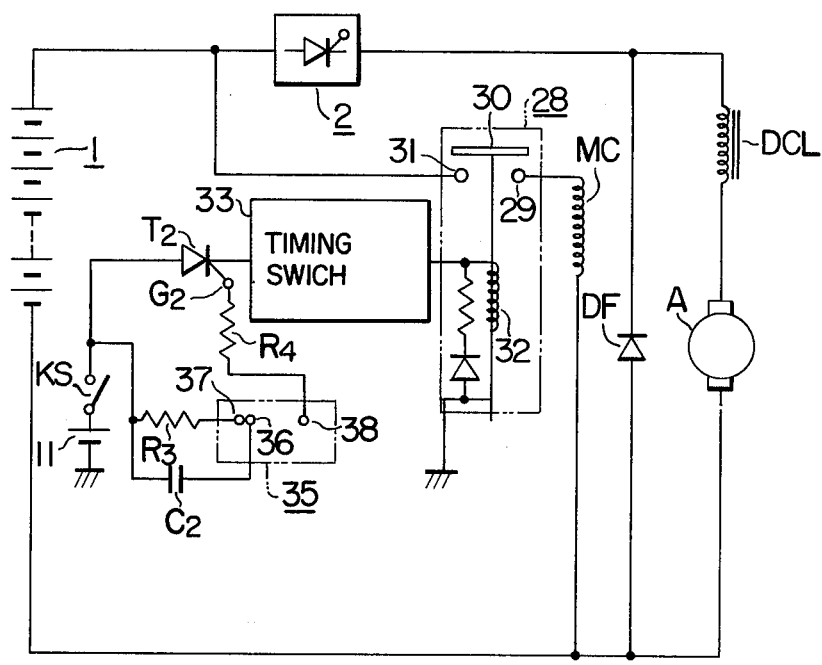

FIG. 3 shows still another embodiment of the present invention in which such means are employed. In FIG. 3 in which like reference numerals and symbols are used to denote like parts appearing in FIG. 1, a magnet switch 28 which is capable of interrupting the current supplied to the magnetizing coil MC is employed by way of example.

Referring to FIG. 3, this magnet switch 28 is shown including a movable contact 30, stationary contacts 29, 31 and an energizing coil 32. A magnetizing coil MC is similarly wound around the permanent magnet of the permanent magnet motor in the electric vehicle and is connected at one end thereof to the stationary contact 29 of the magnet switch 28 and at the other end thereof to a main power source 1. In FIG. 3, the permanent magnet is magnetized by current supplied to the magnetizing coil MC by the circuit which is traced from the main power source 1 — stationary contact 31 of switch 28 — movable contact 30 of switch 28 — stationary contact 29 of switch 28 — magnetizing coil MC to the main power source 1, and this circuit is established only when the switch 28 is energized by current supplied to the energizing coil 32. This energizing current is supplied to the energizing coil 32 from a low-voltage or auxiliary power source 11 through a key switch KS, a thyristor $T_2$ and a timing switch 33. This timing switch 33 is of the automatic reset type which is designed to be automatically reset in several seconds to several minutes after operating for a limited period of time of several milliseconds to several seconds in response to the application of the voltage from the auxiliary power source 11.

A dead man switch 35 is connected to the gate $G_2$ of the thyristor $T_2$ through a resistor $R_4$. This dead man switch 35 includes a movable contact 36 and stationary contacts 37, 38 and is actuated in response to a specific action of the driver, for example, in response to sitting of the driver on the seat of the electric vehicle. When so actuated, the movable contact 36 is urged from the previous position engaging with the stationary contact 37 to be brought into contact with the other stationary contact 38. In response to the turn-on of the key switch KS in this position of the switch 35, gate current is supplied to the gate $G_2$ of the thyristor $T_2$ by the circuit which is traced from the auxiliary power source 11 — key switch KS — capacitor $C_2$ — movable contact 36 of switch 35 — stationary contact 38 of switch 35 — resistor $R_4$ — timing switch 33 — energizing coil 32 to the gate $G_2$ of thyristor $T_2$. The thyristor $T_2$ is turned on to establish the circuit which is traced from the auxiliary power source 11 — key switch KS —0 thyristor $T_2$ — timing switch 33 to the energizing coil 32. The magnet switch 28 is energized, and the stationary contacts 29 and 31 are shorted by the movable contact 30 to supply current to the magnetizing coil MC thereby magnetizing the permanent magnet of the permanent magnet motor.

Upon lapse of a predetermined period of time of several milliseconds to several seconds, the current supply to the energizing coil 32 is interrupted by the timing switch 33, and the movable contact 30 of the switch 28 is restored to the original position to interrupt the magnetizing current supplied to the magnetizing coil MC. The thyristor $T_2$ would not be turned on after the automatic resetting of the timing switch 33 since the capacitor $C_2$ is fully charged and no gate current can be supplied to the gate $G_2$ of the thyristor $T_2$.

In order to magnetize the permanent magnet again, it is necessary to deenergize the dead man switch 35 and then energize this switch 35 again so as to discharge the charge stored in the capacitor $C_2$ through a resistor $R_3$. That is, the driver must release his weight imparted to the seat and then sit down again.

A resistor and a diode are connected in series across the energizing coil 32 so as to prevent generation of a spark which may be produced during interruption of the energizing current supplied through the timing switch 33.

The arrangement may be such that the permanent magnet is magnetized only when demagnetization occurs therein. Various methods may be employed for checking as to whether the permanent magnet is demagnetized or not. For example, demagnetization can be detected by detecting the performance of the motor, and two methods, the voltage value at a selected rpm is detected to detect demagnetization as follows: $N = K (E/\phi) E - V - I_M{}^2 R - V_b(I)$. In the other method, the current value at a selected torque is detected to detect demagnetization as follows $T = K'\phi I, I = I_M - I_o$. The magnetic flux density may be measured to detect demagnetization. For this purpose, a Hall element may be employed or any other element sensitive to magnetism may be employed.

Figure 4:
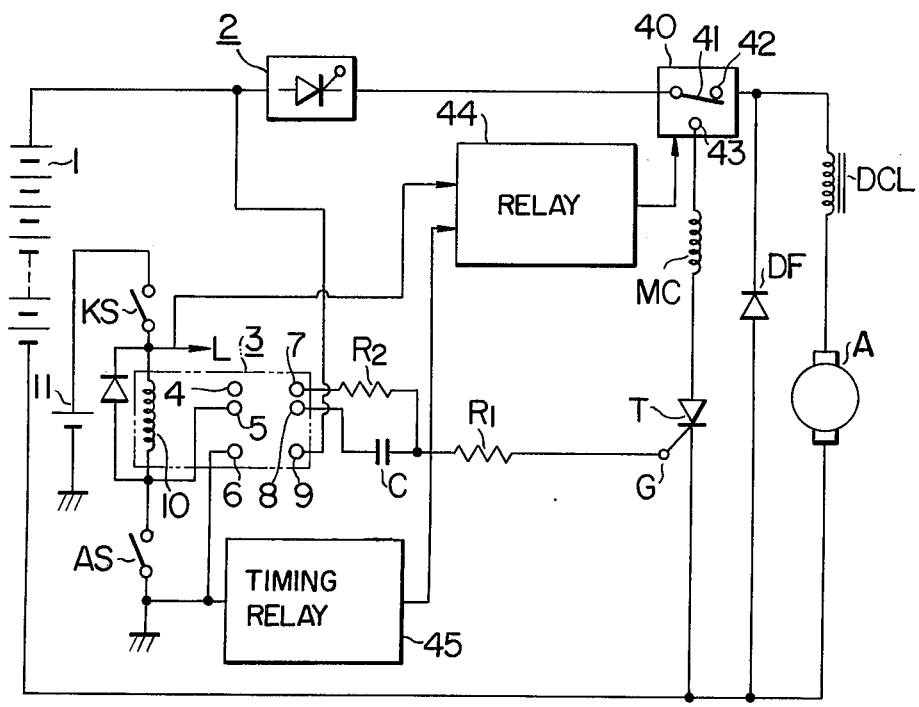

FIG. 4 shows yet another embodiment of the present invention, and like reference numerals and symbols are used to denote like parts appearing in FIG. 1.

Referring to FIG. 4, a change-over switch 40 having a movable contact 41 and stationary contacts 42, 43 is provided for selectively applying power supply voltage of a main power source 1 to the armature A of the permanent magnet motor and to a magnetizing coil MC wound around the permanent magnet of the permanent magnet motor. When a key switch KS is in the off state, the movable contact 41 of the switch 40 is in contact with the stationary contact 42. In response to the turn-on of the key switch KS, a relay 44 is energized to bring the movable contact 41 of the switch 40 into contact with the stationary contact 43. Then, when an accelerator switch AS is turned on, a thyristor T is turned on to supply current to the magnetizing coil MC through a chopper 2. (These operations are the same as those described with reference to FIG. 1.) A timing relay 45 starts to operate in response to the turn-on of the accelerator switch AS and acts to deenergize the relay 44 upon lapse of a predetermined period of time, thereby bringing the movable contact 41 of the switch 40 into contact with the stationary contact 42 again.

This timing relay 45 is constructed to bring the movable contact 41 of the switch 40 into contact with the stationary contact 42 after the gate current ceases to flow to the gate G of the thyristor T and the magnetizing current ceases to flow to the magnetizing coil MC. Further, the arrangement is suchs that the duty factor of the chopper 2 is kept at the minimum during the change-over of the switch 40 and this duty factor starts to progressively increase in proportion to the degree of depression of accelerator pedal with a predetermined delay time after the movable contact 41 of the switch 40 is brought into contact with the stationary contact 42. The timing relay 45 is turned off in response to the turn-off of the key switch KS.

According to the embodiment shown in FIG. 4, the desired magnetization can be sufficiently carried out within a short period of time due to the fact that no current is supplied to the armature A of the permanent magnet motor when magnetizing current is being supplied to the magnetizing coil MC.

The present invention provides various advantages as described below. Firstly, an inexpensive permanent magnet can be employed because the coercive force thereof need not be so large. Secondly, magnetization of the permanent magnet for continuously maintaining the permanent magnet in the desired magnetized state is carried out in response to a specific step in a series of predetermined steps required for starting the electric vehicle from the stopped state or stopping the electric vehicle from the running state or during running of the electric vehicle. Therefore, the present invention eliminates utterly such possiblility that the driver who is unconscious of demagnetization of the permanent magnet drives the electric vehicle to cause undesirable overheating of the permanent magnet motor or the electrical energy stored inthe main power source or battery is consumed earlier than designed. Thirdly, the energy required for the magnetization of the permanent magnet is negligibly little because the permanent magnet can be magnetized within a short period of time during necessary manipulation for starting the electric vehicle from the stopped state or stopping the electric vehicle from the running state.

We claim:

1. In an electric vehicle equipped with a main dc power source, a permanent magnet motor, and a chopper controlling the current supplied from said main dc power source to said permanent magnet motor, a magnetizing device comprising a magnetizing coil wound around the permanent magnet of said permanent magnet motor, and means for supplying magnetizing current to said magnetizing coil in response to a specific step in a series of predetermined steps required for the operation of the electric vehicle.

2. A magnetizing device as claimed in Claim 1, wherein said magnetizing current is supplied to said magnetizing coil through said chopper, and the circuit supplying said magnetizing current to said magnetizing coil is opened when the output current of said chopper is nil.

3. In an electric vehicle equipped with a main dc power source, a permanent magnet motor, a chopper, an accelerator pedal, a key switch for turning on the power source circuit whens turned on, and a chopper controller operative in response to the depression of said accelerator pedal for controlling said chopper thereby controlling the current supplied from said main dc power source to said permanent magnet motor, a magnetizing device comprising a magnetizing coil wound around the permanent magnet of said permanent magnet motor, and means for supplying magnetizing current to said magnetizing coil for a predetermined period of time in response to the initial depression of said accelerator pedal after turning on said key switch.

* * * * *